United States Patent [19]

Iijima

[11] Patent Number: 4,535,517
[45] Date of Patent: Aug. 20, 1985

[54] METHOD FOR PRODUCING A CONNECTING ROD FOR A RADIAL PISTON MOTOR

[75] Inventor: Yoshio Iijima, Nagoya, Japan

[73] Assignee: Daido Metal Company Ltd., Nagoya, Japan

[21] Appl. No.: 538,732

[22] Filed: Oct. 3, 1983

Related U.S. Application Data

[62] Division of Ser. No. 242,767, Mar. 11, 1981, Pat. No. 4,432,122.

Foreign Application Priority Data

[30]

Oct. 8, 1980 [JP] Japan .................. 55-141779

[51] Int. Cl.³ .............................................. B23P 15/10
[52] U.S. Cl. .................. 29/156.5 A; 29/411; 29/412; 29/414; 29/415; 29/527.3; 29/527.5; 29/527.6; 29/DIG. 6; 74/579 E; 164/69.1; 164/112; 164/114; 228/159; 427/241
[58] Field of Search ................. 29/156.5 A, 411, 412, 29/414, 415, 527.3, 527.5, 527.6, DIG. 6; 74/579 R, 579 E; 164/69.1, 70.1, 108, 112, 114; 228/182, 155, 159; 427/241

[56] References Cited

U.S. PATENT DOCUMENTS

| | | | |
|---|---|---|---|
| 1,939,782 | 12/1933 | Kerruish | 164/114 X |
| 2,112,697 | 3/1938 | Van Halteren | 29/414 |
| 3,467,169 | 9/1969 | Johnsson | 164/114 X |
| 3,921,701 | 11/1975 | Cordone | 29/527.3 X |
| 4,030,179 | 6/1977 | Schwarz | 29/411 X |
| 4,441,240 | 4/1984 | Mori | 29/156.5 A |

Primary Examiner—Howard N. Goldberg
Assistant Examiner—Ronald S. Wallace
Attorney, Agent, or Firm—Karl W. Flocks; Sheridan Neimark

[57] ABSTRACT

A connecting rod for a radial piston motor including a spherical surface portion, a rod portion and a pad portion having a sliding surface. The spherical surface portion, rod portion and pad portion are formed integrally, and the sliding surface has a bearing alloy attached to its surface by centrifugal casting. An overlay may be provided on the bearing alloy. The connecting rod is produced in a mass production basis by a method including the steps of integrally forming a star-shape cylindrical monolithic blank (18) having a single cylindrical centrally located axial opening and bearing six equally spaced outwardly radiating rod portions (2), each rod portion bearing an integral, substantially spherical surface portion (1) on its distal end; attaching a bearing alloy by centrifugal casting, to the centrally located axial opening in said blank (18); machining the surface of the bearing alloy; and dividing the blank into six pieces constituting six connecting rods. The machined surface of the bearing alloy may be provided with an overlay, such as a Pb-base alloy.

2 Claims, 10 Drawing Figures

METHOD FOR PRODUCING A CONNECTING ROD FOR A RADIAL PISTON MOTOR

This is a division of application Ser. No. 242,767 filed Mar. 11, 1981, now U.S. Pat. No. 4,432,122 issued Feb. 21, 1984.

BACKGROUND OF THE INVENTION

This invention relates to a connecting rod including a spherical surface portion, a rod portion and a pad portion for a radial piston motor suitable for use with watercraft, concrete mixers, etc., and a method of producing same.

This type of connecting rod has hitherto been produced, as shown in FIG. 1, by first forming a spherical surface portion 1, a rod portion 2 and a pad portion 3 having a sliding surface 5 integrally with one another (to provide a blank 4) as by a lost-wax precision casting process, and then applying a lining of white metal bearing alloy to the sliding surface 5 (of arcuate shape as shown in FIG. 3 et seq.) of the pad portion 3 by pouring molten alloy thereon. Owing to the complex shape of the connecting rod, a casting process used for applying a white metal bearing alloy becomes complex in construction, thereby increasing cost and making it difficult to obtain a bearing alloy of highly compact and uniform structure because difficulties are encountered in effecting uniform cooling which is one of the conditions for casting that should be met. Thus a bearing alloy having a lining applied thereto by pouring molten alloy, such as molten white metal bearing alloy, on the sliding surface of the pad portion has tended to have segregated thereon acicular crystals ($Cu_6Sn_5$) and cubic crystals (SbSn), which are hard and bittle intermetallic compounds, and to have coarse crystals formed thereon.

Before and after the blank 4 has a lining applied to the sliding surface 5 of the pad portion 3 by pouring molten alloy thereon, the blank is machined individually to have its inner diameter finished. This has made it necessary to use a machining and holding device of a complex shape. Thus the time required for machining such workpiece has been long and no stability has ever been obtained in the precision with which the workpiece is finished. When an overlay is applied to the bearing alloy as required, each workpiece has to be treated individually, and this has made it necessary to use an expensive device of complex construction and perform a time-consuming operation. Yet it has hitherto been difficult to provide an overlay of uniform thickness.

SUMMARY OF THE INVENTION

This invention has been developed for the purpose of obviating the aforesaid disadvantages of the prior art. Accordingly, the invention has as its object the provision of a connecting rod for a radial piston motor and a method of producing same which has the features and offers the advantages that are set forth hereinafter.

(1) The use of a centrifugal casting process enables a uniform and stable quality to be obtained in castings produced. More specifically, when a lining of white metal bearing alloy is applied to the sliding surface 5 of the pad portion 3, the bearing metal provided by casting has a structure characteristic of a centrifugal casting which is composed of fine and uniform crystals and free from segregation of acicular and cubic crystals, and the bearing metal has good bonding capability with regard to the back metal (the sliding surface 5 of the pad portion 3 of the blank 4).

(2) The workpieces are arranged in the form of a ring when machined, so that measuring can be readily effected and the articles can have a dimensional accuracy. Moreover, since a plurality of workpieces can be machined in one operation, the time required for machining can be reduced and the operation can be performed smoothly because jigs of different diameters can be freely used.

(3) An overlay is applied to the workpieces arranged in the form of a ring, so that no bulge is formed at the circumferential end portion and the inner surface has good contact. The overlay applying jig is simple in construction and permits operation to be performed smoothly.

DESCRIPTION OF THE PREFERRED EMBODIMENTS

Figure 1:
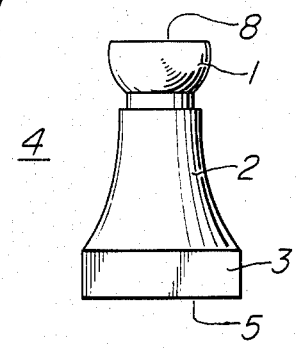
FIGS. 1-8 are front views of the connecting rod for a radial piston motor comprising one embodiment of the invention, in explanation of the steps followed in production.
Figure 2:
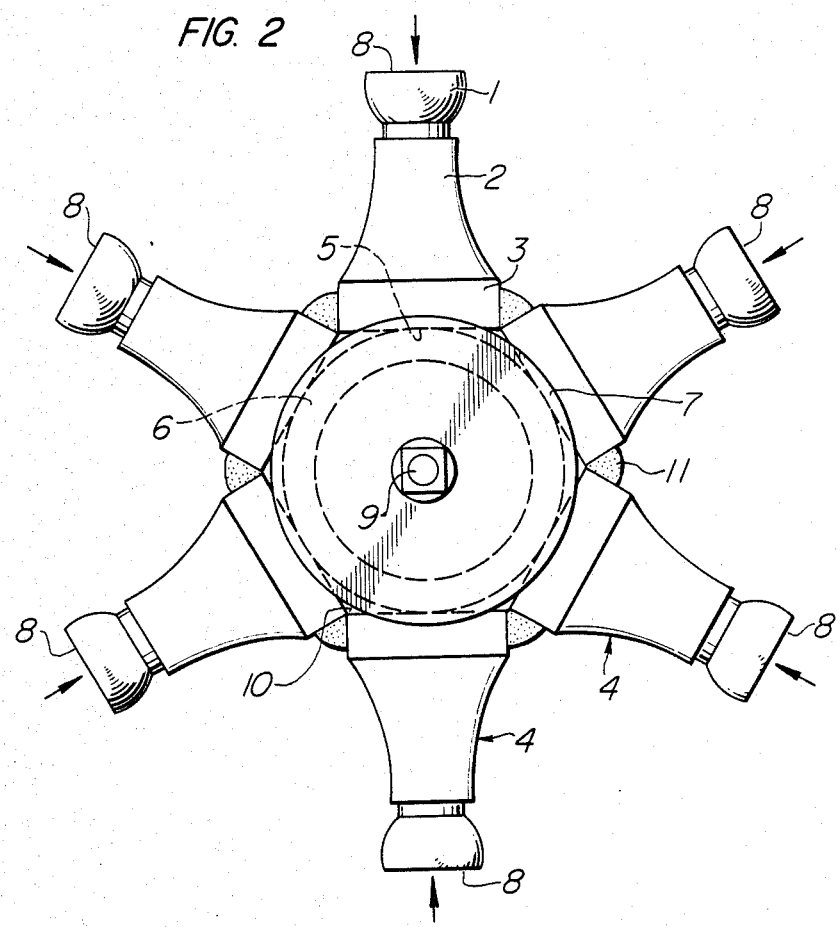
Figure 3:
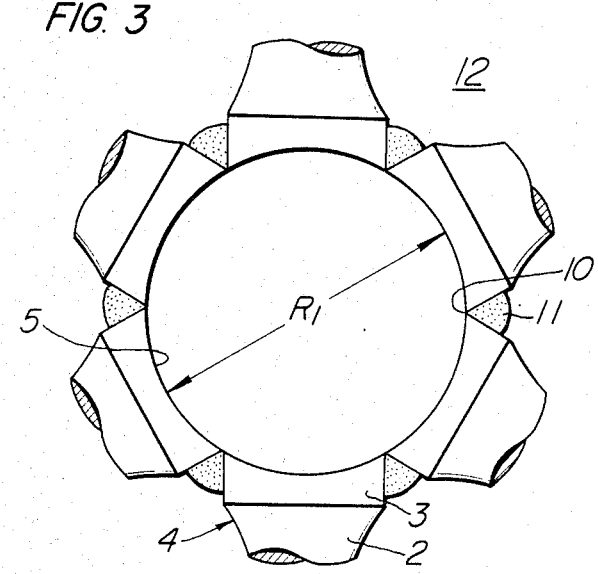

FIGS. 1-8 show the process steps followed in producing the connecting rod comprising one embodiment of the invention. In FIG. 2, six blanks 4 are assembled in the form of a ring around a metal core 6 located in the central portion of a mounting device, not shown, and then a pressing plate 7 is mounted. The blanks 4 are pressed at their planar tops 8 of the spherical surface portions 1 in the direction of arrows toward the center 9 of the metal core 6 and clamped. Then the mounting device, not shown, is placed on a welding table, not shown, and the blanks 4 are joined together by welding at joints 10. The numeral 11 designates welds formed by build-up welding. Upon completion of welding, the pressing plate 7 and metal core 6 are removed, and the blanks 4 in the form of a ring are machined as by a machine tool so as to give a predetermined value $R_1$ to the inner diameter of an assembly 12 of blanks in ring form, as shown in FIG. 3.

Figure 4:
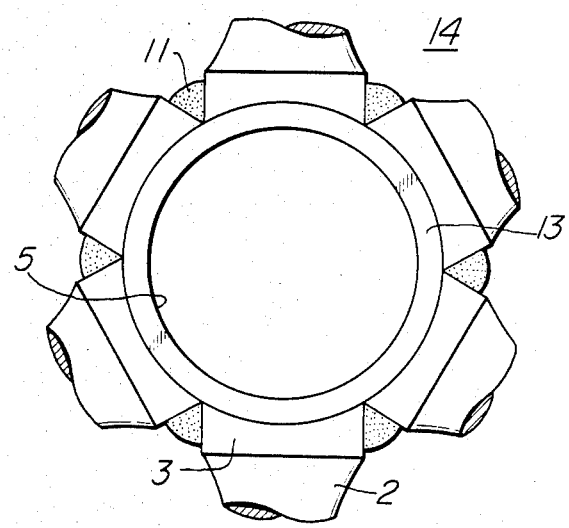
Figure 5:
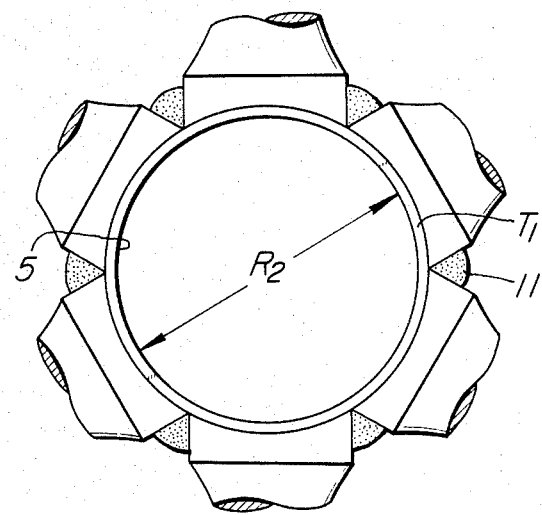

Following machining, the assembly 12 is mounted on a centrifugal casting apparatus as shown in FIG. 4 and subjected to centrifugal casting by pouring a molten white metal bearing alloy. The numeral 13 designates a white metal bearing alloy layer formed by centrifugal casting. Upon completion of casting, an assembly 14 of blanks 4 with the white metal bearing alloy layer 13 thereon is machined by a machine tool to have its inner diameter finished to have a predetermined value $R_2$, as shown in FIG. 5. That is, the white metal bearing alloy layer has a predetermined thickness $T_1$. Although not shown, other machining steps, such as width adjusting, offsetting, groove forming (circumferentially and/or axially) and oil sump forming, etc., may be performed as required.

Figure 6:
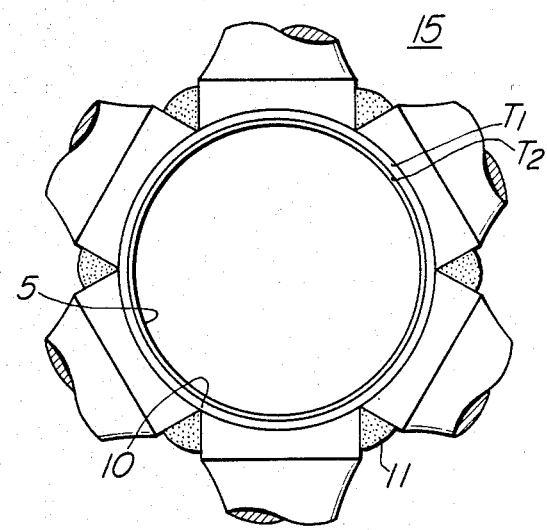

Upon completion of machining, a coating $T_2$ of a composition containing 10% of Sn and the balance of Pb, for example, is applied as an overlay by electric plating to the surface of the bearing metal layer 13 that has had its inner diameter finished. The numeral 15 designates an assembly of blanks 4 in ring form with overlays, as shown in FIG. 6.

Figure 7:
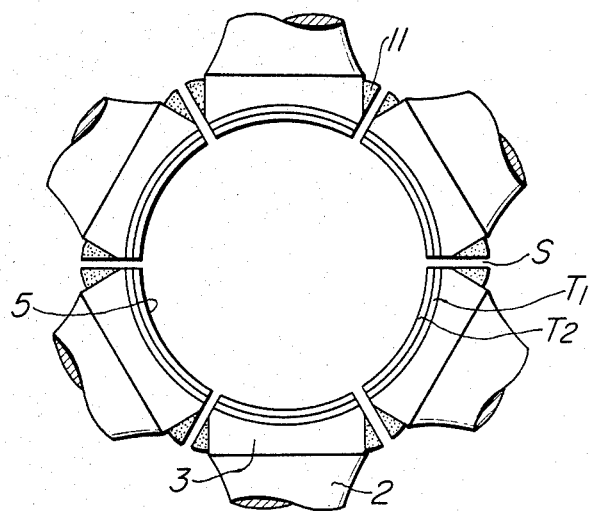
Figure 8:
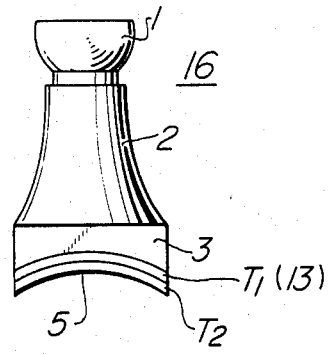

The assembly 15 of blanks 4 in the ring form with overlays is cut as by a saw at the joints 10 and welds 11 into six pieces as shown in FIG. 7, to provide connecting rods 16 of the desired shape and dimensions as shown in FIG. 8. The symbol S designates a portion at which a cut was initially made.

The connecting rod 16 of the embodiment shown in FIGS. 1-8 and described hereinabove has the features and offers the advantages as described in paragraphs (1) to (3) in the summary of the invention.

Figure 9:
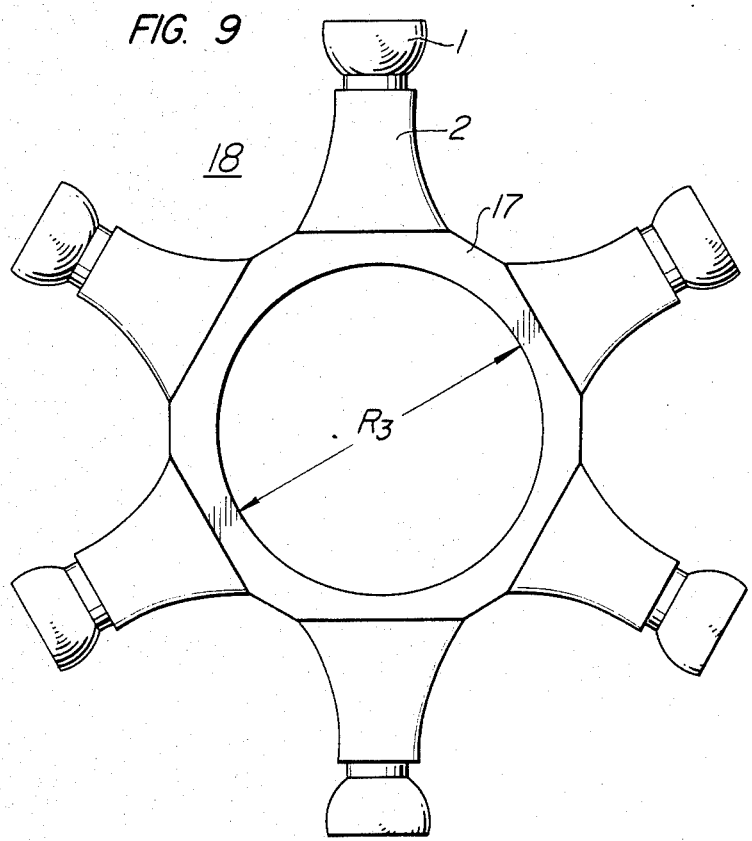
FIGS. 9 and 10 are front views of the connecting rod comprising another embodiment, in explanation of the steps followed in production.
Figure 10:
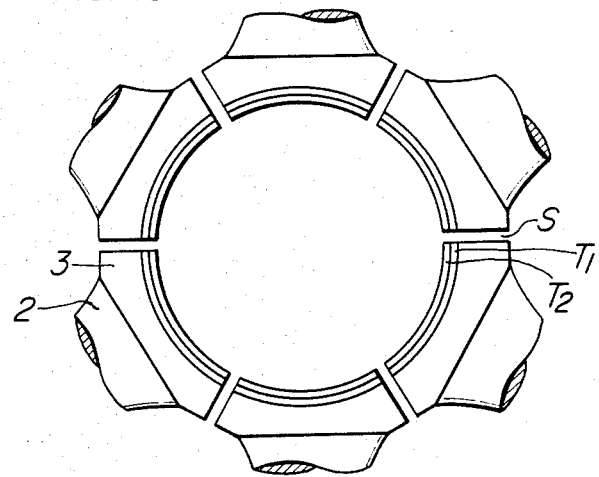

FIGS. 9 and 10 show another embodiment in a front view. In the embodiment shown in FIGS. 1-8, the assembly of the blanks 4 in ring form has the blanks 4 welded at the joints 10 and connected together at the welds 11. The embodiment shown in FIGS. 9-10 eliminates the need to join the blanks 4 by welding and provides what is generally referred to as a star-shaped cylindrical monolithic blank 18 in which six spherical surface portions 1 and six rod portions 2 are formed integrally and six rod portions 2 and a cylindrical pad 17 are formed integrally, as by a lost-wax precision casting process. The star-shaped cylindrical blank 18 is then mounted on a machine tool, such as a lathe, and machined to give a predetermined value $R_3$ to the inner diameter of the cylindrical pad 17.

Following machining, the star-shaped cylindrical blank, not shown, is processed through the steps of centrifugal casting, machining and electric plating and cut, as shown in FIG. 10, into six pieces. Each of the six pieces constitutes the connecting rod 16 shown in FIG. 8 having a predetermined shape and sizes. The symbol S designates a portion at which a cut was initially made. The connecting rod 16 of the embodiment shown in FIGS. 9 and 10 and described hereinabove has the features and offers the advantages as described in paragraphs (1) to (3).

In the two embodiments shown and described hereinabove, the coating $T_2$ is provided by electric plating. However, the step of electric plating may be dispensed with depending on the use to which the connecting rod is put. The coating $T_2$ provided by electric plating may have a composition freely selected from the group of known compositions, such as Sn-Cu-Pb and Sn-In-Pb alloys, etc. An overlay (surface layer) may be provided by any suitable known process other than electric plating, such as centrifugal casting. The bearing alloy is not limited to white metal, and any other suitable bearing alloy, such as copper-base bearing alloys, including copper-lead alloy (Kelmet), lead bronze, etc., may be used. When a copper base bearing alloy is used and a centrifugal casting process is adopted, the alloy generally has a dendrite structure in which dendrites of copper are formed and arranged in a direction in which the alloy is cooled. When a system of casting with bottom pouring is adopted, the alloy produced generally has a structure in which massive or net-like crystals of no directional form are present. It goes without saying that the alloy of the former structure is more suitable for producing a bearing than that of the latter structure because the crystals thereof are finer and more uniform.

Alloys produced by centrifugal casting and by casting with simple molten alloy pouring are distinct from each other in structure not only in bearing alloys but also in other type of alloys, and they can be distinguished from each other.

In both first and second embodiments, six workpieces have been shown and described as being worked in the process for producing connecting rods. However, the invention is not limited to this specific number of workpieces and any number of workpieces, such as 2, 3, 4, 5 and 7, may be worked depending on the size and shape of the connecting rod to be obtained.

From the foregoing description, it will be appreciated that the method for producing a connecting rod according to the invention offers the advantage that the connecting rods can be produced on a mass production basis, and that the connecting rods produced by the method according to the invention is better in quality than connecting rods of the prior art.

What is claimed is:

1. A method for producing a connecting rod for a radial piston motor, comprising the steps of:
   (A) producing from a steel material a star-shape cylindrical monolithic blank having a single cylindrical centrally located axial opening, bearing six equally spaced outwardly radiating, integral rod portions (2), each rod portion (2) bearing an integral, substantially spherical surface portion (1) at its distal end;
   (B) applying by centrifugal casting a white metal bearing alloy or a copper base bearing alloy onto an inner surface of said single cylindrical centrally located axial opening in said blank (18);
   (C) machining an inner surface of said bearing alloy applied by centrifugal casting; and
   (D) dividing said blank (18) along a radial axis at a position between each of said rod portions (2) and the adjacent rod portions.

2. A method for producing a connecting rod for a radial piston motor, comprising the steps of:
   (A) producing from a steel material a star-shape cylindrical monolithic blank having a single cylindrical centrally located axial opening, bearing six equally spaced outwardly radiating, integral rod portions (2), each rod portion (2) bearing an integral, substantially spherical surface portion (1) at its distal end;
   (B) applying by centrifugal casting a white metal bearing alloy or a copper base bearing alloy onto an inner surface of said single cylindrical centrally located axial opening in said blank (18);
   (C) machining an inner surface of said bearing alloy applied by centrifugal casting;
   (D) applying onto said machined surface of bearing alloy an overlay ($T_2$) of Pb-base alloy; and
   (E) dividing said blank (18) along a radial axis at a position between each of said rod portions (2) and the adjacent rod portions.

* * * * *